United States Patent [19]

Schauder et al.

[11] Patent Number: 5,734,257
[45] Date of Patent: Mar. 31, 1998

[54] TRANSMISSION LINE POWER CONTROLLER WITH A CONTINUOUSLY CONTROLLABLE VOLTAGE SOURCE RESPONSIVE TO A REAL POWER DEMAND AND A REACTIVE POWER DEMAND

[75] Inventors: Colin D. Schauder, Murrysville; Scott L. Williams, Irwin; Laszlo Gyugyi, Pittsburgh, all of Pa.

[73] Assignee: Electric Power Research Institute, Inc., Palo Alto, Calif.

[21] Appl. No.: 627,483

[22] Filed: Apr. 4, 1996

Related U.S. Application Data

[63] Continuation of Ser. No. 279,178, Jul. 22, 1994.
[51] Int. Cl.$^6$ .......................................... G05F 5/00
[52] U.S. Cl. ..................... 323/207; 363/39; 363/40; 307/105; 323/212
[58] Field of Search ................... 323/205, 207, 323/212; 363/34, 35, 37, 39; 307/105

[56] References Cited

U.S. PATENT DOCUMENTS

4,752,726  6/1988  Aoyama .......................... 323/207
5,138,247  8/1992  Tanoue et al. .................... 323/207
5,343,139  8/1994  Gyugyi et al. .................... 323/207

*Primary Examiner*—Peter S. Wong
*Assistant Examiner*—Shawn Riley
*Attorney, Agent, or Firm*—Flehr Hohbach Test Albritton & Herbert LLP; William S. Galliani

[57] ABSTRACT

A transmission line power controller for controlling the flow of electric power in an alternating current three-phase transmission system is described. The power line controller includes a parallel inverter connected to a series inverter through a dc link. The parallel inverter is connected in shunt to the transmission system through a shunt transformer. The series inverter is connected in series with the transmission system through a series transformer. A transmission line power control circuit is used to specify a desired real power demand and reactive power demand for the transmission system. The power control circuit processes this information along with a transmission line voltage vector and a transmission line current vector to produce a voltage source reference signal that is applied to the series inverter. In response to the voltage source reference signal, the series inverter produces an injected voltage vector into the transmission system. The injected voltage vector forces the transmission line current vector to a desired value corresponding to the specified real power and reactive power demand. Thus, desired real power and reactive power flow is rapidly achieved on the transmission system.

16 Claims, 8 Drawing Sheets

TRANSMISSION LINE POWER CONTROLLER WITH A CONTINUOUSLY CONTROLLABLE VOLTAGE SOURCE RESPONSIVE TO A REAL POWER DEMAND AND A REACTIVE POWER DEMAND

This is a continuation of application Ser. No. 08/279,178 filed Jul. 22, 1994.

BRIEF DESCRIPTION OF THE INVENTION

This invention relates generally to the control of bulk electrical power on a transmission line. More particularly, this invention relates to a unified power flow control apparatus with a continuously controllable voltage source that produces a desired real and reactive power flow on a three-phase transmission line.

BACKGROUND OF THE INVENTION

Figure 1:
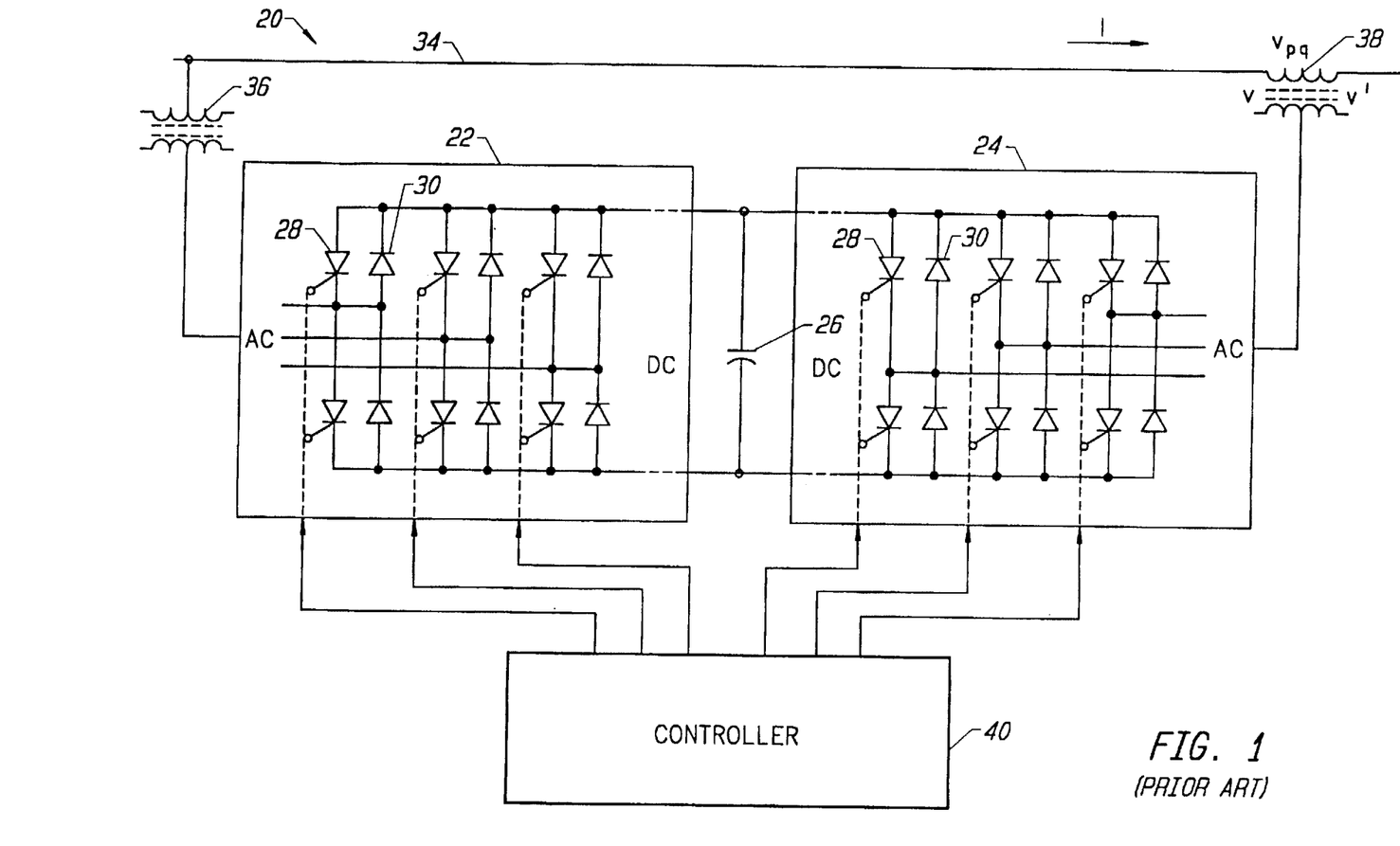
FIG. 1 is an illustration of a prior art unified power flow controller.

A generalized power flow controller is described by Gyugyi, et al. in U.S. Pat. No. 5,343,139 entitled "Generalized Fast, Power Flow Controller" (the Gyugyi patent), which is incorporated by reference herein. This device is referred to as a Unified Power Flow Controller (UPFC) in the art. The architecture of a UPFC implementation is illustrated in FIG. 1.

This implementation of the UPFC 20 includes a parallel inverter 22 connected to a series inverter 24 through a dc link 26. The inverters of FIG. 1 each include six semiconductor switches 28, such as Gate-Turn-Off (GTO) thyristors, each of which is shunted by a reverse-parallel connected diode 30. The UPFC 20 is connected to a transmission line 34 through a shunt transformer 36 and a series transformer 38. As used herein, the term transmission line includes the three lines of a three-phase transmission system.

In accordance with the prior art, the UPFC 20 includes a controller 40 that executes a control strategy based upon the emulation of conventional power line control devices, such as thyristor-controlled series capacitors or thyristor-controlled phase angle regulators. That is, the controller 40 monitors selected line parameters and in response thereto, fires the switches 28 to realize a conventional power line control strategy.

In general, the UPFC 20 functions as an ac to ac power converter in which real power can freely flow in either direction between the ac terminals of the two inverters. In addition, each inverter can independently generate or absorb reactive power at its own ac output terminal.

The series inverter 24 can be regarded as a series voltage source with controllable magnitude and angle. The parallel inverter 22 can be regarded as a unity power factor current source with a magnitude that is sufficient to ensure that the real power drawn by the shunt device is equal and opposite to the real power drawn by the series device.

The series inverter 24 provides the main function of the UPFC 24 by injecting, through series transformer 38, an ac voltage Vpq with controllable magnitude and phase angle with respect to the phase of the transmission line voltage. This injected series voltage can be considered as a synchronous ac voltage source. In the prior art, selection of magnitude and phase angle of the injected voltage Vpq has been used to adjust any one or more of the following system parameters: transmission line voltage magnitude, transmission line impedance, and transmission line voltage phase angle.

The real power that is injected by the series inverter 24 is obtained from the parallel inverter 22. The parallel inverter 22 supplies or absorbs real power through the shunt transformer 36. The parallel inverter 22 can also generate or absorb controllable reactive power at the shunt transformer 36, and thereby it can provide independent shunt reactive compensation for the line.

The flow of real power in or out of the dc link 26 is determined by the phase angle of the ac voltage generated by the parallel inverter with respect to the ac system voltage. The flow of reactive power to or from the parallel inverter is determined by the amplitude difference between the ac voltage signal of the parallel inverter 22 and the ac voltage signal on transmission line 34. If the amplitude of the ac voltage signal from the parallel inverter 32 is larger than the amplitude of the ac voltage signal on transmission line 34, then the parallel inverter 22 supplies capacitive reactive power. If the amplitude of the ac voltage signal from the parallel inverter 32 is smaller than the amplitude of the ac voltage signal on transmission line 34, then the parallel inverter 22 consumes inductive reactive power.

It should be noted that there is a closed path for real power from the transmission line 34, through the shunt transformer 36, through the parallel inverter 22, through the dc link 26, through the series inverter 24, and through the series transformer 38 back to the transmission line 34. In contrast, the corresponding reactive power is supplied or absorbed locally by the parallel inverter 22 and therefore it does not flow through the line. Thus, the parallel inverter 22 can be operated at a unity power factor or it can be controlled to have a reactive power exchange with the line independently of the reactive power exchanged by the series inverter. Consequently, there is no continuous reactive power flow through the UPFC 20.

The basic operations of the parallel inverter and the series inverter may be established by any number of well known techniques, such as pulse-width modulation (PWM). Regardless of the technique selected, the parallel inverter maintains the dc link voltage at an essentially constant level that corresponds to the highest output voltage produced by either inverter.

As previously indicated, UPFCs 20 are conventionally controlled from the standpoint of existing power transmission practices based on reactive shunt compensation, series compensation, and phase shifting. For example, terminal voltage regulation can be achieved when Vpq is injected in-phase or anti-phase with the line voltage V to produce conditioned line voltage V'. To provide series capacitive compensation, Vpq is injected in quadrature with the line current I. Transmission angle regulation is achieved when Vpq is injected with an angular relationship with respect to V that achieves the desired phase shift (advance or retard) without any change in magnitude.

The Gyugyi patent mentioned above relies upon these traditional paradigms to control the UPFC. In particular, the patent states that the controller is used to operate the parallel inverter and series inverter in a coordinated manner to ensure that: "(1) the ac output voltage of the [series inverter is] injected in phase to meet the instantaneous requirements of the controlled system parameters (line impedance, phase-angle, voltage magnitude) at the output end of the [series transformer] for optimum power transfer, as dictated by the relevant reference signals supplied to the [controller 40], and (2) the ac output voltage of [the parallel inverter is] coupled to the ac system by the [shunt transformer and] has the proper magnitude and phase-angle to provide the real power demand of the [series inverter] and to generate or absorb the reactive power at the input end of the [series transformer] to regulate the voltage at that point according to an externally defined reference." The patent later indicates that the externally defined reference signals are the only control inputs to the system. One reference signal to the shunt inverter control is a voltage magnitude signal (τ*) and the other reference signal is an angle reference signal (α*).

Thus, the prior art is concerned with directing the switching activity within the power electronic circuits of the UPFC 20 such that the UPFC 20 operates as conventional power line control devices.

One shortcoming of the approach of controlling a UPFC 20 to emulate conventional power line control devices is that previously these devices have been used individually. Consequently, no rules exist for using them together to achieve an optimal control of power flow.

It would be desirable to introduce a completely new paradigm for the control of power transmission lines. That is, it would be desirable to develop a new transmission line power control system that does not rely upon the emulation of conventional power line control devices.

SUMMARY OF THE INVENTION

The invention is a transmission line power controller for controlling the flow of electric power in an alternating current three-phase transmission system. The preferred implementation of the power line controller includes a parallel inverter connected to a series inverter through a dc link. The parallel inverter is connected in shunt to the transmission system through a shunt transformer. The series inverter is connected in series with the transmission system through a series transformer. A transmission line power control circuit is used to specify a desired real power demand and reactive power demand for the transmission system. The power control circuit processes this information along with a transmission line voltage vector and a transmission line current vector to produce a voltage source reference signal that is applied to the series inverter. In response to the voltage source reference signal, the series inverter produces an injected voltage vector into the transmission system. The injected voltage vector forces the transmission line current vector to a desired value corresponding to the specified real power and reactive power demand. Thus, desired real power and reactive power flow is rapidly achieved on the transmission system.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
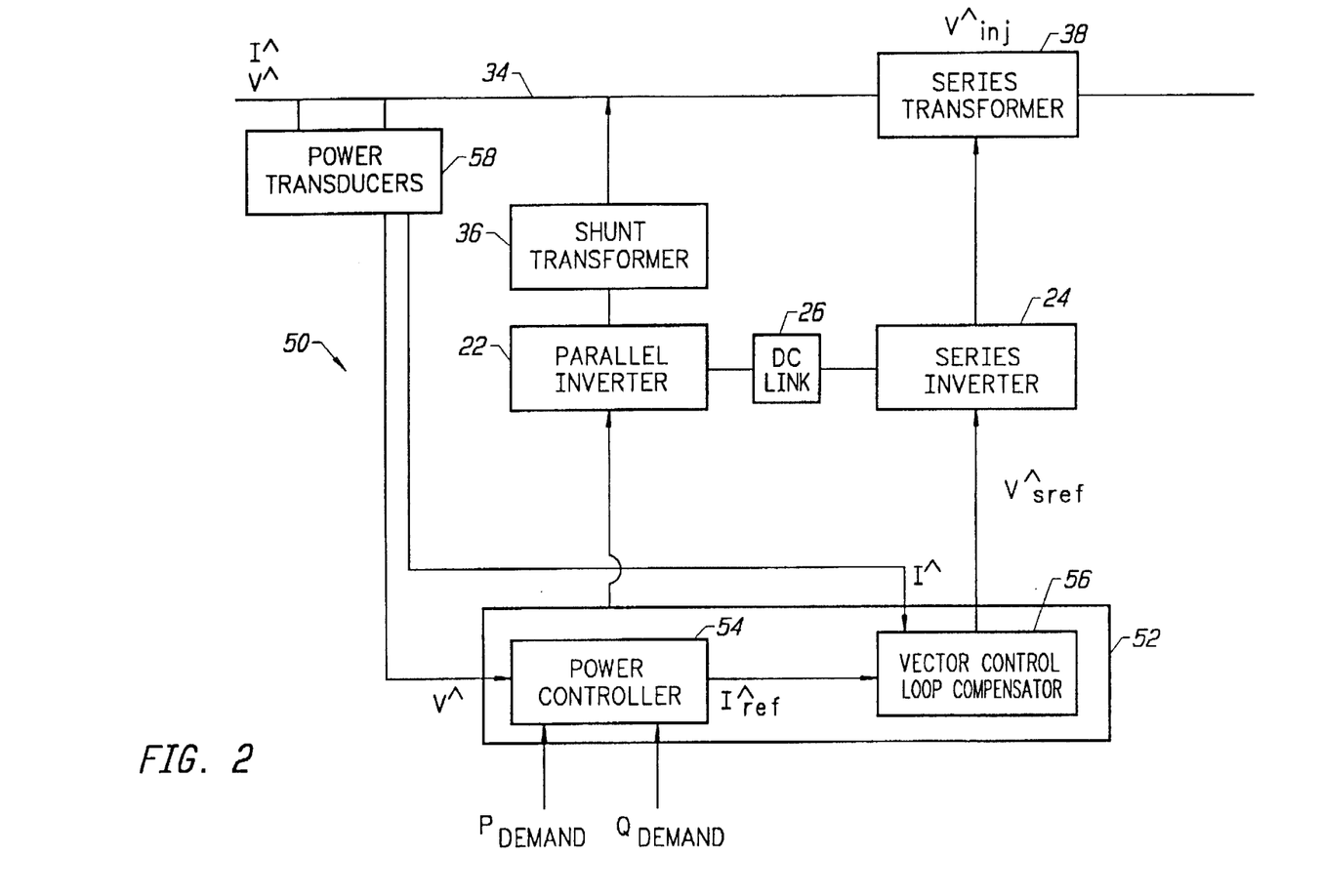
FIG. 2 is an illustration of the transmission line power controller of the present invention.

FIG. 2 illustrates a transmission line power controller 50 in accordance with the invention. The transmission line power controller 50 includes a number of elements previously described in relation to the prior art unified power flow controller. In particular, the figure illustrates a parallel inverter 22 connected to a series inverter 24 through a dc link 26. The parallel inverter 22 is connected in shunt to a three-phase transmission line 34 through a shunt transformer 36. The series inverter 24 is connected to the three-phase transmission line 34 through a series transformer 38.

In accordance with the invention, control of the parallel inverter 22, series inverter 24, and dc link 26 is accomplished through the transmission line power control circuit 52 of the invention. The transmission line power control circuit 52 includes a power controller 54 and a vector control loop compensator 56.

A set of conventional power transducers 58 are used in a feedback control loop to continuously generate a transmission line current vector signal I^ and a transmission line voltage vector signal V^. The power controller 54 receives the transmission line voltage vector signal V^, a real power demand (P), and a reactive power demand (Q). The real power demand may be established through a real power flow specification device. This device may be a supervisory computer system, a keyboard, an analog dial, a thumb-wheel switch, etc. A reactive power flow specification device is similarly used to obtain the reactive power demand.

These signals are processed by the power controller 54 to produce a current control reference signal $I^{\wedge}_{ref}$ which is processed by the vector control loop compensator 56 to produce a voltage source reference signal $V^{\wedge}_{s\_ref}$. The voltage source reference signal $V^{\wedge}_{s\_ref}$ is processed by the series inverter 24 in a conventional manner to generate an injected voltage vector $V^{\wedge}_{inj}$. The injected voltage vector $V^{\wedge}_{inj}$ forces the transmission line current vector I^ to a desired value corresponding to the real power demand P and the reactive power demand Q. Thus, at the point of sampling at the power transducers 58, the power on the transmission line corresponds to the real power demand P and the reactive power demand Q.

In sum, the transmission line power controller 50 of the invention uses the injected voltage vector $V^{\wedge}_{inj}$ as a controllable vector forcing function to force the transmission line current vector I^ to produce desired real power and reactive power flow on the transmission line. The injected voltage vector is established by the power control circuit 52 as it monitors the transmission line voltage V^ and continuously calculates the appropriate current reference for a desired real power (P) and reactive power (Q).

The automatic control of an injected series voltage vector to maintain a demanded P,Q condition on a transmission line is believed to be a new concept. Note that the power control circuit 52 is not intended to simply reproduce the actions of conventional equipment such as, mechanical or thyristor-controlled phase angle regulators, load tap-changes, and series capacitors. That is, the power control circuit 52 does not rely upon a strategy of changing the line parameters to accomplish an intended result. Instead, the power control circuit 52 uses closed-loop feedback control along with P and Q demands to continuously calculate the necessary injected voltage vector to control the transmission line current. That is, power control circuit 52 controls the magnitude and angular position of the injected voltage vector in real time so as to maintain or vary the real and reactive power flow on the line to satisfy load demand and system operating conditions.

The power control circuit 52 uses established techniques to control the parallel inverter 22. In this regard, the power control circuit 52 acts to maintain a preset voltage level on the dc link 26, thereby ensuring the required real power balance between the parallel inverter 22 and the series inverter 24. Since this operation is known in the art, attention turns to a more detailed consideration of the operation of the power control circuit 52 to produce the voltage reference signal that is used by the series inverter 24 to generate the injected voltage vector.

Figure 3:
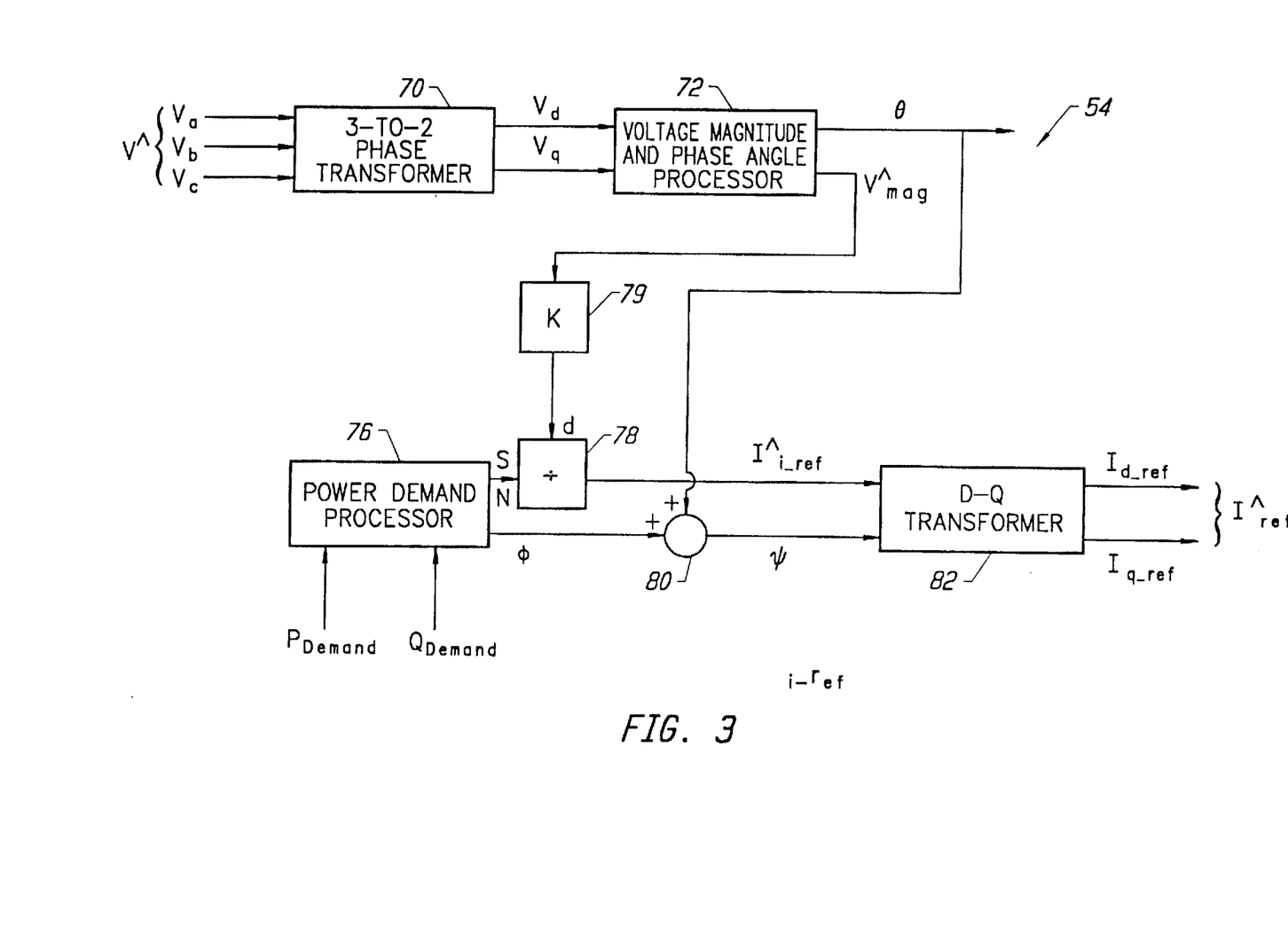
FIG. 3 depicts an embodiment of the power controller of the power control circuit of the invention.

FIG. 3 is a detailed representation of one embodiment of the power controller 54 of the power control circuit 52. In this embodiment, a 3-to-2 phase transformer 70 is used to transform the three-phase voltage vector V^ (Va, Vb, Vc) into a two-phase d-q quantity that is stationary with respect to the three-phase system. The 3-to-2 phase transformer 70 relies upon synchronous control. Real-time control using synchronous control concepts is known in ac motor control and active power line conditioning. U.S. Pat. No. 5,287,288 (the '288 patent), assigned to the assignee of the present invention, and expressly incorporated by reference herein, discloses the use of synchronous control in active power line conditioning.

While synchronous control has been used in active power line conditioners (APLC), it is important to note the distinctions between the active power line conditioning technical field and the technical field of the present invention. The present invention is directed toward a power transmission line transmitting power from one voltage-regulated bus to another. An APLC provides power conditioning between a distribution feeder and one or more loads. In other words, an APLC provides a buffering action between a power supply and a load. More particularly, an APLC is concerned with providing sinusoidal voltages to the load and passing sinusoidal currents back to the supply. An APLC does not in any sense attempt to determine the real power flow between the supply and the load. It is the load that determines the power flow, and the APLC attempts primarily to remove harmonic content from the load voltage and the supply current. In contrast, the present invention teaches how to regulate the power flow between two voltage buses to a desired value, and is not concerned with harmonic content. Thus, the present invention uses different processing techniques and generates different reference signals.

In any event, the '288 patent and other references fully describe synchronous control. However, for the sake of completeness, it will be appreciated that the 3-to-2 phase transformer 70 executes the following equation:

$$\begin{bmatrix} V_q \\ V_d \end{bmatrix} = \sqrt{2/3} \begin{bmatrix} 1 & -1/2 & -1/2 \\ 0 & -\sqrt{3}/2 & \sqrt{3}/2 \end{bmatrix} \begin{bmatrix} V_a \\ V_b \\ V_c \end{bmatrix}$$

The derived d-q line voltage signals Vd and Vq are then processed by the voltage magnitude and phase angle processor 72. The voltage magnitude and phase angle processor 72 derives a transmission line phase angle signal θ and a transmission line voltage magnitude signal $V^{\wedge}_{mag}$. These quantities may be obtained with the following equations:

$$\theta = \arctan(Vd/Vq) \quad (1)$$

$$V^{\wedge}_{mag} = ((Vd)^2 + (Vq)^2)^{1/2} \quad (2)$$

Other techniques may be used to derive these quantities. For example, the '288 patent discloses the use of a phase-locked loop to obtain the value θ.

FIG. 3 also illustrates a power demand processor 76 that is used to generate a complex power demand signal S and a power factor demand φ. These quantities are calculated based upon the previously described real power demand P and reactive power demand Q. To obtain the complex power demand signal and the power factor demand signal, the following equations may be executed by the power demand processor 76

$$S = (P_2 + Q_2)^{1/2} \quad (3)$$

$$\phi = \arctan(Q/P) \quad (4).$$

FIG. 3 illustrates that the complex power demand signal S is divided by the transmission line voltage magnitude signal at divider 78 to obtain an intermediate current control reference signal $I^{\wedge}_{i\_ref}$. Depending upon the 3-to-2 phase transformer equations used, the voltage magnitude signal may have to be multiplied at multiplier 79 by a scaling constant to extract the current signal from the voltage magnitude signal.

FIG. 3 also illustrates that the transmission line phase angle signal is added to the power factor demand signal to obtain a current vector reference angle signal ψ. The current vector reference angle signal ψ and the intermediate current control reference signal $I^{\wedge}_{i\_ref}$ are then processed by the D-Q transformer 82. The D-Q transformer 82 transforms the power coordinates to rectangular coordinates projected onto the d-q axes. These values are denominated the d-q current control reference signals $I_{d\_ref}$ and $I_{q\_ref}$. Note that these signals constitute the previously described current control reference signal $I^{\wedge}_{ref}$. The d-q current control reference signals $I_{d\_ref}$ and $I_{q\_ref}$ may be obtained by using the following equations:

$$I_{d\_ref} = I^{\wedge}_{ref} \cos(\psi) \quad (5)$$

$$I_{q\_ref} = I^{\wedge}_{ref} \sin(\psi) \quad (6)$$

The processing of the power controller 54 to generate the current control reference signal $I^{\wedge}_{ref}$ has now been fully described. Attention presently turns to FIG. 4, which is a detailed depiction of one embodiment of the vector control loop compensator 56 of the invention. The vector control loop compensator 56 includes a 3-to-2 phase transformer 70 of the type previously described. However, note that in this instance, the 3-to-2 phase transformer 70 operates upon the transmission line current vector I^, which includes three-phase components Ia, Ib, Ic. The d-q transmission line current signals Id and Iq generated by the 3-to-2 phase transformer 70 are subtracted from the previously described d-q current control reference signals $I_{d\_ref}$ and $I_{q\_ref}$ to generate d-q current control error signals $I_{d\_err}$ and $I_{q\_err}$.

Figure 4:
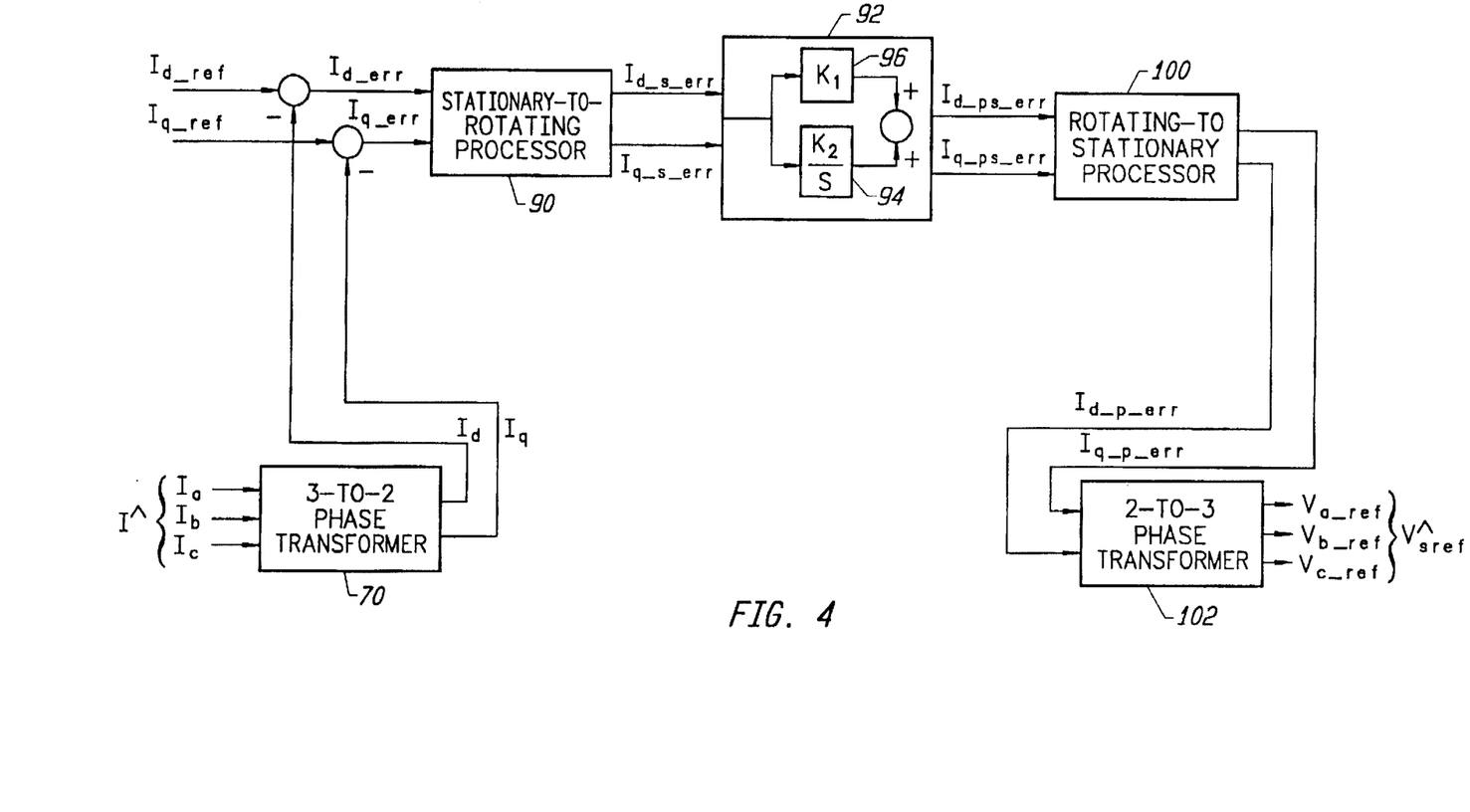
FIG. 4 illustrates one embodiment of the vector control loop compensator of the power control circuit of the invention.

Another known synchronous control element, a stationary-to-rotating processor 90, is used to process the d-q current control error signals $I_{d\_err}$ and $I_{q\_err}$. This operation may be performed as follows:

$$\begin{bmatrix} I_{q\_s\_err} \\ I_{d\_s\_err} \end{bmatrix} = \begin{bmatrix} \cos\theta & -\sin\theta \\ \sin\theta & \cos\theta \end{bmatrix} \begin{bmatrix} I_{q\_err} \\ I_{d\_err} \end{bmatrix}$$

The θ term was previously obtained by the voltage magnitude and phase angle processor 72. The output of the stationary-to-rotating processor 90 is a set of synchronous d-q current control error signals $Id_{13}s\_err$ and $Iq\_s\_err$. These signals are dc quantities in the synchronous reference frame. They correspond to the fundamental component of the error signal.

The synchronous d-q current control error signals may now be processed by a synchronous reference frame processor 92. For the sake of simplicity, only a single line is shown entering and exiting the synchronous reference frame processor 92.

In the embodiment of FIG. 3, the synchronous reference frame processor includes an integrator 94 and a proportional gain element 96. The integrator 94 serves to provide high gain for the error vector components. The proportional gain element 96 serves to stabilize the signal. The outputs of the integrator 94 and proportional gain element 96 result in processed synchronous d-q current control error signals Id_ps_err and Iq_ps_err.

A rotating-to-stationary processor 100 is then used to remove the signals from the synchronous reference frame. The following equations may be used for this operation:

$$\begin{bmatrix} I_{q\_p\_err} \\ I_{d\_p\_err} \end{bmatrix} = \begin{bmatrix} \cos\theta & \sin\theta \\ -\sin\theta & \cos\theta \end{bmatrix} \begin{bmatrix} I_{q\_ps\_err} \\ I_{d\_ps\_err} \end{bmatrix}$$

This operation produces stationary reference frame processed d-q current control error signals Id_p_err and Iq_p_err. These signals are then transformed to a three-phase signal with a 2-to-3 phase transformer 102 that executes the following equation:

$$\begin{bmatrix} Va-ref \\ Vb-ref \\ Vc-ref \end{bmatrix} = \sqrt{2/3} \begin{bmatrix} 1 & 0 \\ -1/2 & -\sqrt{3}/2 \\ -1/2 & \sqrt{3}/2 \end{bmatrix} \begin{bmatrix} Iq-p-err \\ Id-p-err \end{bmatrix}$$

The 2-to-3 phase transformer 102 yields three-phase reference signals Va_ref, Vb_ref, and Vc_ref. Note that these signals are equivalent to the previously described voltage source reference signal $V^{\wedge}_{s\_ref}$. As previously indicated, the voltage source reference signal $V^{\wedge}_{s\_ref}$ is then applied to the series inverter 24 by means of an appropriate modulator (such as a PWM) as known by those skilled in the art. This operation forces the series inverter 24 to generate the previously described injected voltage vector $V^{\wedge}_{inj}$, which forces the line current vector I^ to a desired value corresponding to the real and reactive power demand received by the power control circuit 52.

The operation of one embodiment of the power control circuit 52 of the invention has now been described. Attention will now turn to alternate embodiments of the invention.

Figure 5:
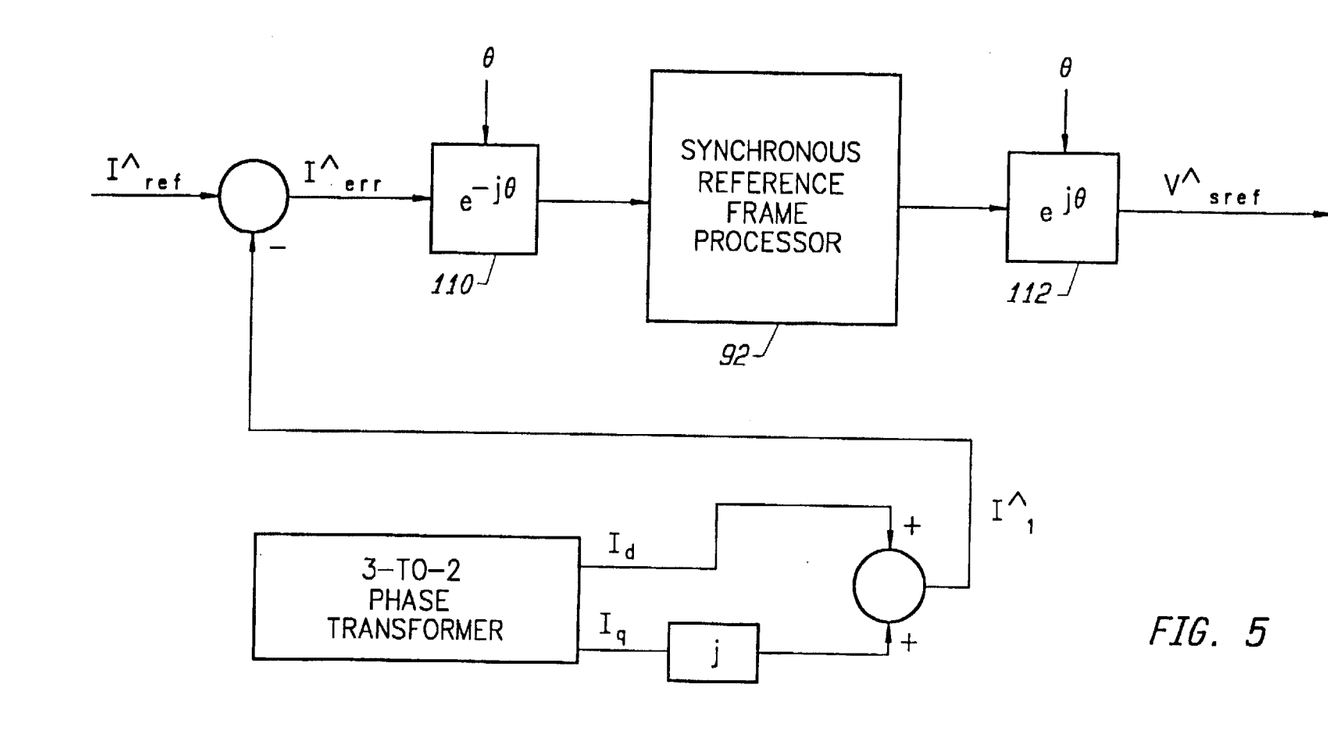
FIG. 5 is a vectorial representation of the vector control loop compensator of the invention.

FIG. 5 illustrates the vector control loop compensator 56 in vector notation. As in the embodiment of FIG. 4, a 3-to-2 phase transformer 70 is used to generate two-phase d-q quantities. The signal Iq is multiplied by a complex component j. Similarly, the q component (Iq_ref—shown in FIG. 3) of the current control reference signal is multiplied by a complex component j to yield the current control reference signal I^ref shown in FIG. 5. These signals are combined to produce a current control error signal I^err which is applied to a negative vector rotator 110. The negative vector rotator 110 rotates the error vector signal I^err negatively through the angle θ, derived from the voltage magnitude and phase angle processor 72. This produces a synchronous vector error signal that is processed in the previously described synchronous reference frame processor 92 to generate a processed synchronous vector error signal. A positive vector rotator 112 is then used to positively rotate the processed synchronous vector error signal through the angle θ. This produces a signal corresponding to the previously described voltage source reference signal $V^{\wedge}_{sref}$.

Figure 6:
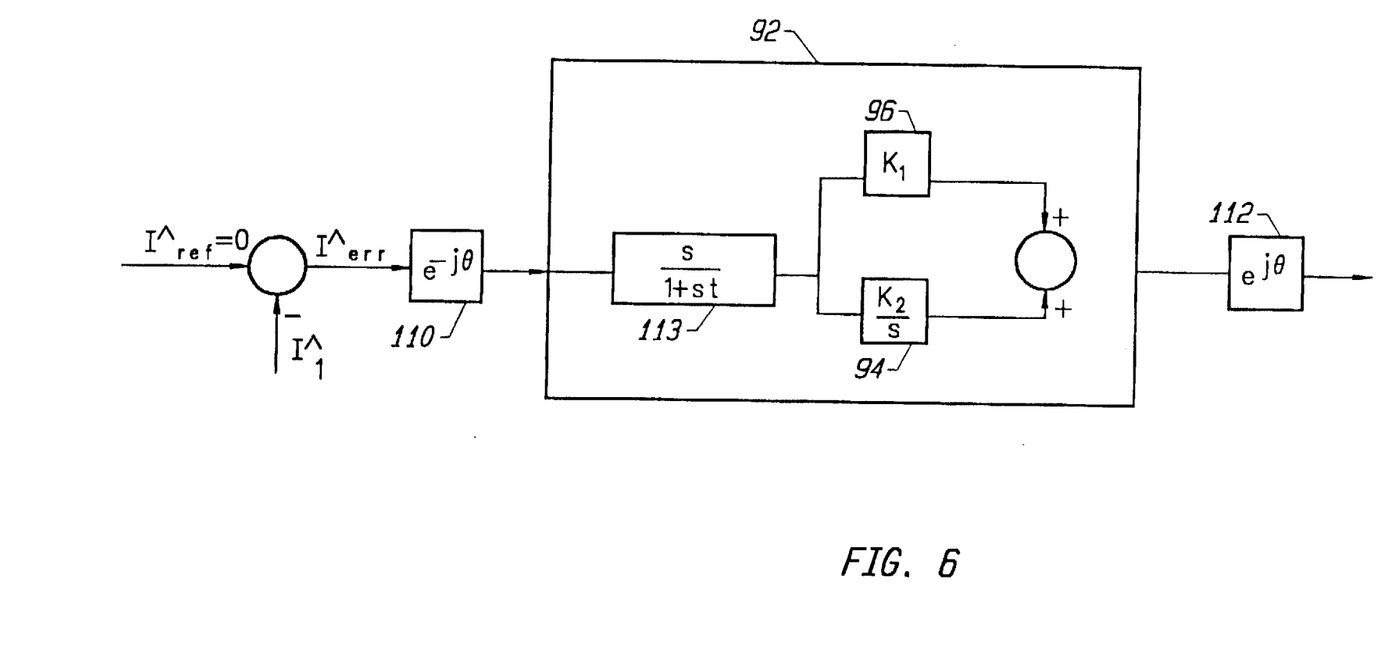
FIG. 6 is an alternate embodiment of the vector control loop compensator to be used to eliminate power oscillations or rapid power transients.

FIG. 6 illustrates an alternate embodiment of the vector control loop compensator 56. This embodiment is similar to the embodiment of FIG. 5. However, there are two major distinctions. First, in this embodiment, the current control reference signal I^ref is set to zero. Next, the synchronous reference frame processor 92 includes an additional derivative term S/(1+sT) in block 113. This additional term controls the rate of change of transmission line power according to the time constant T. Thus, with the embodiment of FIG. 6, the transient power on the transmission line is controlled to a desired value of zero. In this configuration, the power control circuit 52 will not attempt to dictate the steady state power flow of the line, but will only act to eliminate power oscillations or rapid power transients.

Figure 7:
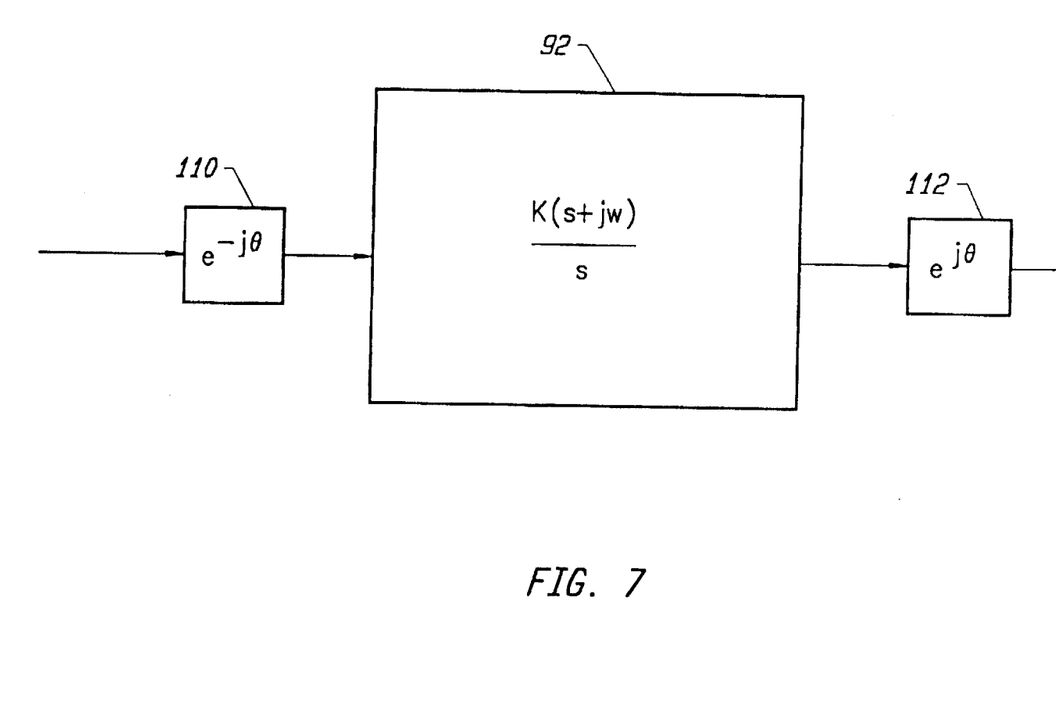
FIG. 7 is an alternate embodiment of the synchronous reference frame processor of the vector control loop compensator.

FIG. 7 illustrates another alternate embodiment of the synchronous reference frame processor 92. In this embodiment, the synchronous reference frame processor 92 only has one term: K(s+jw)/S. This term has proven to be particularly advantageous as it provides a more stable response, while compensating for the line inductance.

Figure 8:
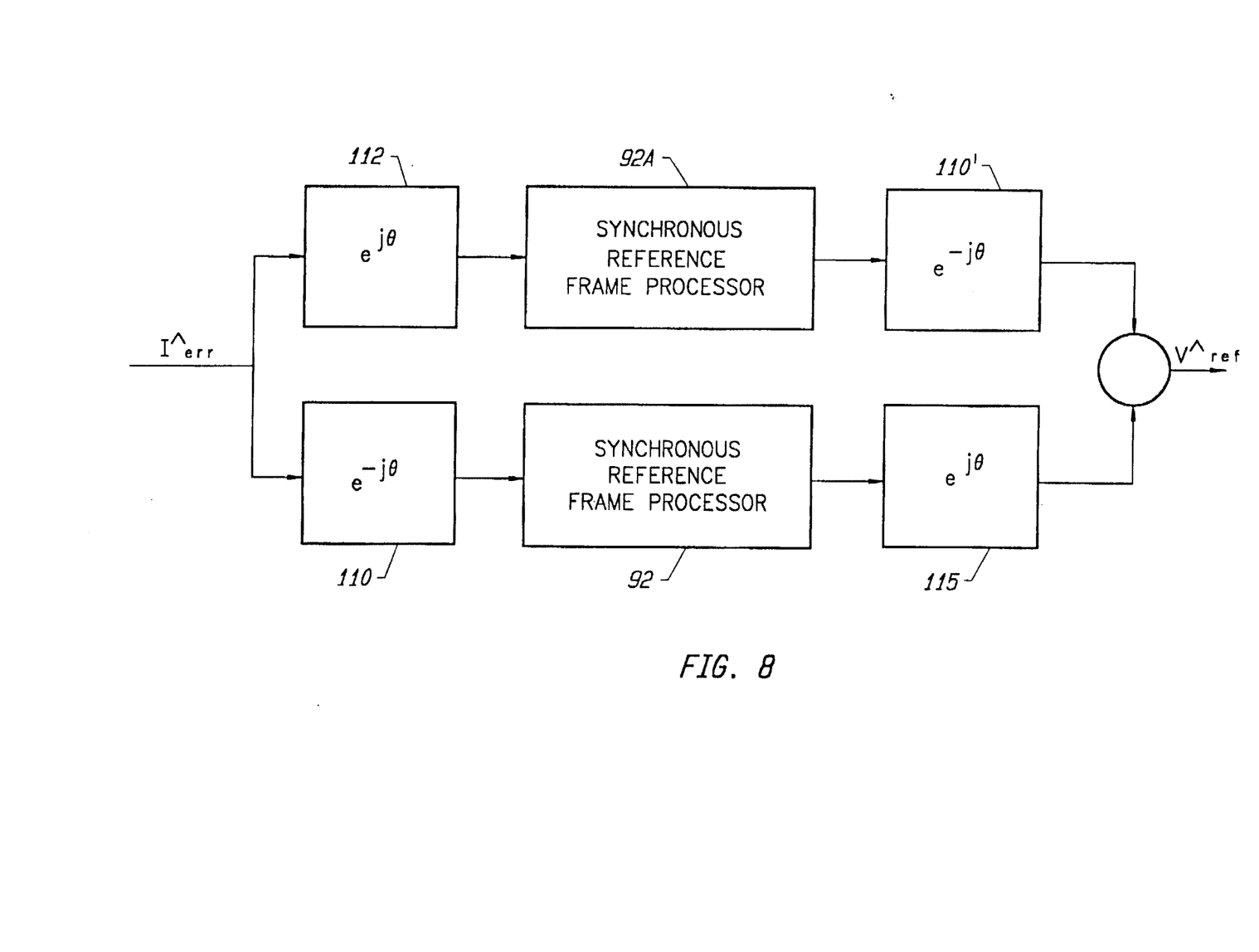
FIG. 8 is an alternate embodiment of the vector control loop compensator to be used to eliminate a negative sequence line component.

FIG. 8 is similar to previous embodiments, but includes an additional rotating frame controller. The additional controller is synchronous with the vector representing the negative sequence fundamental frequency component of the line voltage. That is, the current control error signal I^err is processed by the negative vector rotator 110 as previously described, but in addition, it is processed by a positive vector rotator 112 to process the negative sequence fundamental frequency component of the line voltage. The negative sequence fundamental frequency component is processed by the synchronous reference frame processor 92A and is then processed by a negative vector rotator 110'. The output is then combined with the processed positive sequence fundamental frequency component. The resultant voltage source reference signal V^sref includes a negative sequence voltage signal component that will automatically reduce the negative sequence line current to zero.

Any of the described embodiments can be used as an automatic power flow limiter. In this variation, the power control circuit 52 is kept in an inactive state (i.e. the series voltage is set to zero) until the transmission line power exceeds a preset maximum level. At this time, the power control circuit 52 is enabled and is operated in such a way as to limit the power to the set level. This power limiting embodiment can be used in any situation where overloading of the line can produce undesirable effects on power system stability.

Those skilled in the art will recognize a number of advantages associated with the present invention. First, the ability to define a real and reactive power demand opens up a range of possibilities for power system control. The attainable response of the control is very fast, almost instantaneous, and thus the apparatus of the invention is extremely effective in handling dynamic system disturbances. Apart from the obvious advantages for power scheduling and automatic power limiting, the fast dynamic response of the power controller 50 will automatically prevent power oscillations from existing on the line and can adapt almost instantaneously to new real and reactive power demands to enhance the transient behavior of the system and optimize its performance under transmission contingency conditions. In accordance with the invention, negative sequence line current can be controlled to zero. This eliminates current unbalance and restores maximum utilization of the transmission line. All of these benefits are derived from the invention's use of a single automatic control system with a constant loop structure. This technique is clearly preferable to the many control modes that wold be required to achieve similar results using existing passive components.

It will be appreciated by those skilled in the art that the power control circuit may be implemented in any number of ways. For instance, the device may hardwired or implemented as a set of computer programs operating on a general purpose computer with appropriate interfaces to the power transducers 58, parallel inverter 22, and series inverter 24.

The power controller 50 of the invention has been described with reference to its preferred embodiment. However, it should be recognized that the power controller 50 can also be implemented in other devices that include at least the series inverter 24. In some cases these applications involve some restriction in the operating range compared with the preferred embodiment, but they are likely to be attractive because of their lower cost, and relatively high effectiveness in controlling power flow. These alternative embodiments all have a series inverter 24 but they differ in regard to the parallel inverter 22. In particular, the parallel inverter 22 may be replaced by other devices that are connected to the dc terminals of the series inverter 24 and are capable of absorbing or supplying real power on a steady state or transient basis, as required.

The application of limits on the range of the series voltage reference signal $V^{\wedge}_{sref}$ has been omitted from the figures for clarity. However, it should be understood that these limits are applied in a physical embodiment of the invention.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A transmission line power controller for controlling the flow of electric power in an alternating current transmission system including a three-phase transmission line, comprising:

continuously controllable voltage sources connected in series with each of the phases of said three-phase transmission line to provide an injected voltage;

signal identification devices connected to said three-phase transmission line to produce a current signal representative of the instantaneous current values of each of said phases of said three-phase transmission line and to produce a voltage signal representative of the instantaneous voltage values of each of said phases of said three-phase transmission line;

a real power flow specification device to receive a real power flow demand;

a reactive power flow specification device to receive a reactive power flow demand; and a power control circuit connected to said continuously controllable voltage sources, said signal identification devices, said real power flow specification device, and said reactive power flow specification device, said power control circuit including:

a power controller to process said voltage signal, said real power flow demand, and said reactive power flow demand and generate a current control reference signal, and a vector control loop compensator to process said current signal and said current control reference signal and generate a voltage source reference signal that is applied to said continuously controllable voltage sources to generate an injected voltage that forces the transmission line current to a desired value corresponding to said real power demand and said reactive power demand.

2. The apparatus of claim 1 wherein said continuously controllable voltage sources are voltage sourced dc-to-ac inverters connected to said transmission line by a transformer.

3. The apparatus of claim 2 wherein said voltage sourced dc-to-ac inverters include dc terminals to absorb and supply real power.

4. A transmission line power flow controller to control the flow of electric power on an alternating current transmission system, comprising:

a transmission line power control circuit including a power controller to generate a current control reference signal from a transmission line voltage signal, a real power flow demand signal, and a reactive power flow demand signal, and a vector control loop compensator to generate a voltage source reference signal from a transmission line current signal and said current control reference signal; and a series inverter connected to said transmission line power control circuit to process said voltage source reference signal and generate an injected voltage that is applied to said alternating current transmission system to force the current of said alternating current transmission system to a desired value corresponding to said real power flow demand signal and said reactive power flow demand signal.

5. The transmission line power flow controller of claim 4 wherein said power controller includes:

a voltage magnitude and phase angle processor to receive said transmission line voltage signal and generate a transmission line phase angle signal and a transmission line voltage magnitude signal;

a power demand processor to receive said real power flow demand signal and said reactive power flow demand signal and generate a complex power demand signal and a power factor demand signal;

a divider to divide said complex power flow demand signal by said transmission line voltage magnitude signal to produce an intermediate current control reference signal; and an adder to add said power factor demand signal to said transmission line phase angle signal to produce a current vector reference angle signal.

6. The transmission line power flow controller of claim 5 wherein said power controller includes:

a transformation device to combine said intermediate current control reference signal and said current vector reference angle signal to generate said current control reference signal.

7. The transmission line power flow controller of claim 4 wherein said vector control loop compensator includes a three-to-two phase transformer to convert said transmission line current vector signal into d-q transmission line current signals.

8. The transmission line power flow controller of claim 7 wherein said vector control loop compensator includes a subtraction circuit to subtract said d-q transmission line current signals from said current control reference signal to produce d-q current control error signals.

9. The transmission line power flow controller of claim 8 wherein said vector control loop compensator includes a signal rotation device to convert said d-q current control error signals to synchronous d-q current control error signals.

10. The transmission line power flow controller of claim 9 wherein said signal rotation device is a stationary-to-rotating processor.

11. The transmission line power flow controller of claim 9 wherein said signal rotation device is a negative vector rotator.

12. The transmission line power flow controller of claim 9 wherein said vector control loop compensator includes a synchronous reference frame processor to convert said synchronous d-q current control error signals to processed synchronous d-q current control error signals.

13. The transmission line power flow controller of claim 12 wherein said synchronous reference frame processor includes an integrator and a proportional gain element to process said synchronous d-q current control error signals and generate said processed synchronous d-q current control error signals.

14. The transmission line power flow controller of claim 11 further comprising a positive vector rotator to process the negative sequence fundamental frequency component of said transmission line voltage vector signal.

15. The transmission line power flow controller of claim 12 wherein said vector control loop compensator includes a reverse signal rotation device to convert said processed synchronous d-q current control error signals into stationary reference frame processed d-q current control error signals.

16. The transmission line power flow controller of claim 15 wherein said vector control loop compensator includes a two-to-three phase transformer to convert said stationary reference frame processed d-q current control error signals into said voltage source reference signal.

* * * * *

UNITED STATES PATENT AND TRADEMARK OFFICE
CERTIFICATE OF CORRRECTION

PATENT NO. : 5,734,257
DATED : March 31, 1998
INVENTOR(S) : Colin D. Schauder, et. al.

It is certified that error appears in the above-identified patent and that said Letters Patent is hereby corrected as shown below:

Title page, item [56], References Cited, add the following Patents and Publications.

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 8 | 6 | 2 | 3 | 4 | 0 | 08/89 | Inokuchi | | | |
| | | 5 | 1 | 9 | 8 | 7 | 4 | 6 | 03/93 | Gyugyi et al. | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | EP | 0 | 28 | 4 | 0 | 0 | 6A | 09/88 | EPO | | | | |
| | | JP | 0 | 11 | 29 | 7 | 7 | 9A | 05/89 | EPO-Patent Abstracts of Japan | | | | |
| | | | | | | | | | | | | | | |

Signed and Sealed this

Ninth Day of March, 1999

Attest:

Q. TODD DICKINSON

*Attesting Officer*  Acting Commissioner of Patents and Trademarks